(No Model.)

2 Sheets—Sheet 1.

W. B. CHAMBERS.
CHECK ROW CORN PLANTER.

No. 334,416. Patented Jan. 19, 1886.

(No Model.)  2 Sheets—Sheet 2.
W. B. CHAMBERS.
CHECK ROW CORN PLANTER.
No. 334,416. Patented Jan. 19, 1886.
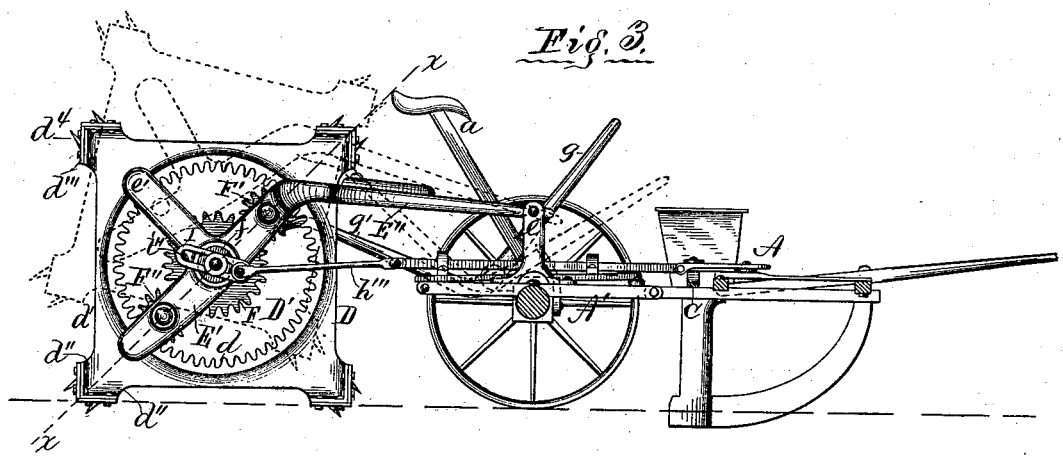
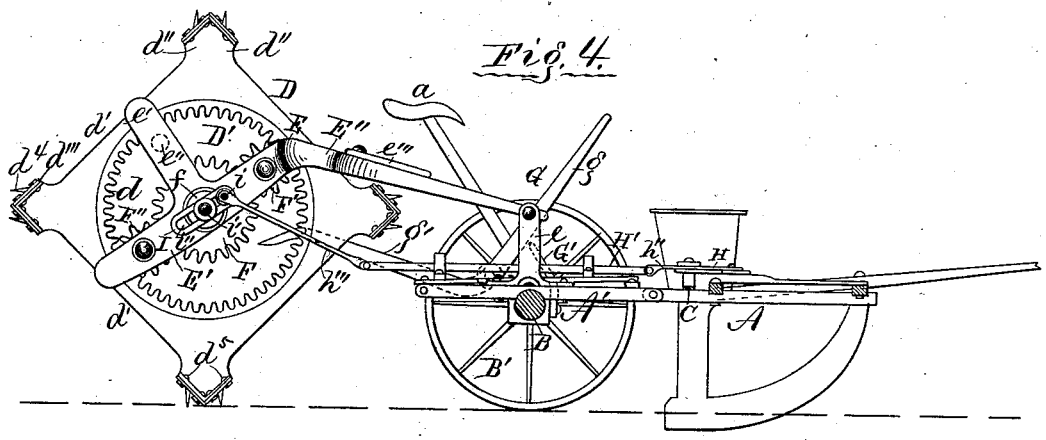
Witnesses:
P. R. Richards.
Benj. Williams
Inventor:
Wm. B. Chambers,
By W. B. Richards,
Atty.

UNITED STATES PATENT OFFICE.

WILLIAM B. CHAMBERS, OF DECATUR, ILLINOIS, ASSIGNOR OF ONE-HALF TO WILLIAM J. QUINLAN, OF SAME PLACE.

CHECK-ROW CORN-PLANTER.

SPECIFICATION forming part of Letters Patent No. 334,416, dated January 19, 1886.

Application filed October 28, 1884. Serial No. 146,665. (No model.)

*To all whom it may concern:*

Be it known that I, WILLIAM B. CHAMBERS, a citizen of the United States, residing at Decatur, in the county of Macon and State of Illinois, have invented certain new and useful Improvements in Check-Row Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of check-row corn-planters in which a supplemental driving-wheel is used, which wheel is rotated by contact with the ground, and transmits motion to the planter seed-slides through intermediate mechanism which connects it with said seed-slides.

The invention consists in constructions and combinations hereinafter fully described.

Figure 1:
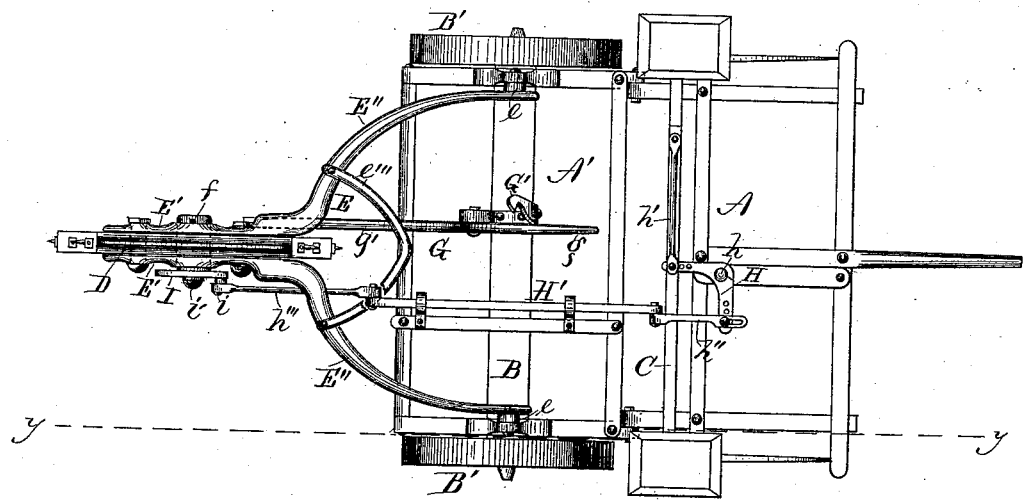
Figure 2:
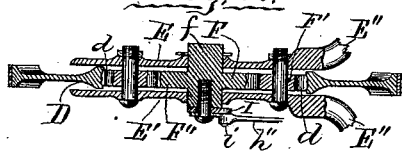

In the accompanying drawings, which illustrate one method of applying my invention, Figure 1 is a top plan. Fig. 2 is an oblique section in line $x\,x$ in Fig. 3. Fig. 3 is a sectional elevation in the line $y\,y$ in Fig. 1. Fig. 4 is a sectional elevation in same plane as Fig. 3, but showing the parts in different relative positions from those shown at Fig. 3.

Referring to the drawings by letters, the same letter indicating the same part in the different figures, letter A represents the forward frame and runners, A' the rear frame, B the axle, B' the supporting-wheels, $a$ the driver's seat, and C the bar which connects and operates the seed-slides, of an ordinary corn-planter, which for use with my improvements may be constructed as shown, or may be of any construction or class of planter desired.

D is the driving-wheel, which I prefer of a square form in its exterior, as shown, but which may be of any form desired. The central part of the drive-wheel is removed to form a circular opening, D'. The interior of the drive-wheel is formed into or provided with an interior cog-gear, $d$.

E' E' are bars, one on each side of and in close proximity to the drive-wheel D.

F is a pinion fixed to journals $f$, one of which projects through and has a bearing in each bar E'. On opposite sides of the pinion F are pinions F' F'', each with an axial bearing in the bars E', and each in gear with the pinion F and with the internal gear, $d$. An arm, E'', extends from each bar E' forward, and the arms E'' are journaled or hinged at their forward ends, one to each of the standards $e$, which project upwardly from the axle B, or from any other suitable part of the planter. The bars E' and pinions F F' F'' form supports for the drive-wheel, which is further supported by arms $e'$, which project outwardly from the bars E', in close proximity to the sides of the wheel D, and are stayed at their outer ends by a connecting-brace, $e''$. The wheel D is held loosely between the bars E' and arms $e'$, so as not to interfere with its rotation. The arms E'' and bars E' together form a vertically-swinging frame, E, for supporting the drive-wheel and connecting it with the planter. The arms E'' are stayed by a brace, $e'''$.

G is a lever, one end, $g$, of which is in convenient reach of the driver from his seat $a$ on the planter, and the other end, $g'$, of which is located beneath one of the arms E''. The driver, by means of the lever G, can raise and lower the drive-wheel as required, and when desired to raise and support the drive-wheel entirely above the ground, can do so by forcing down the forward end of the lever G and locking it by the swinging catch G'.

H is an elbow-lever pivoted at $h$ on the planter-frame. One end of the lever H is connected by a link-rod, $h'$, with the seed-slide bar, and its other end is connected by a link-rod, $h''$, with the forward end of a bar, H', which slides endwise in bearings on the planter-frame. The rear end of the bar H' is connected by a link-rod, $h'''$, with a crank-pin, $i$, on the end of a crank-bar, I, which is secured to one of the journals $f$. The bar I is slotted, and is adjustable lengthwise of itself on the journal $f$, and is held after adjustment by means of a set-screw, $i'$, which passes through the slot $i''$ in the bar I and into the journal $f$. By adjusting the bar I to increase or diminish the distance between the crank-pin $i$ and the journal $f$ the extent of the throw of the planter seed-slides may be adjusted. The link-rod $h''$ is slotted to receive the journal-bolt which connects it with the elbow-lever H, and this slot is short enough to not interfere with its operating the seed-slides, while it is long enough to permit of raising and lowering the drive-wheel D, and to permit of either the forward or rear frame of the planter rising and falling or flexing on the other frame. The elbow-lever H is also provided with a series of holes by which both the rods $h'$ and $h''$ are adjustably connected therewith for the purpose of adjusting the extent of throw of the planter seed-slides.

A portion, $d'$, of each side of the wheel D is removed to leave projecting parts $d''$ near each corner of the wheel, which can thereby come in contact with the ground, and not be prevented so doing by the sides of the wheel. Plates $d'''$, provided with spurs $d^4$, are secured to the parts $d''$ by bolts $d^5$. Plates $d'''$ of different thicknesses can be used to regulate the distances between the hills of corn in the rows parallel with the path of the planter, as the addition of thicker plates $d'''$ will increase the distance between the corners of the wheel D, and the distance between said corners is the distance between the hills of corn.

In this class of planter as generally constructed the drive-wheel is drawn from its center, and the force necessary to rotate it also tends to slide or drag it on the ground, and thereby interferes with its properly regulating the distances between the hills of corn. In my device the drive-wheel is drawn from near its upper side by the pinion F', and hence the force necessary to rotate it tends almost entirely to rotate it, and not to drag it upon the ground, and thus insures its rotation without slipping, and thereby secures uniformity in the distances between the hills of corn. The rotation of the wheel D rotates the pinions F' F'', and they in turn rotate the pinion F, which rotates the crank-bar I, and thereby operates the seed-slides of the planter through the elbow-lever H, rods $h'$ $h''$, sliding bar H', and rod $h'''$. Each quarter-revolution of the wheel D gives a throw in one direction to the seed-slide bar C, and operates the seed-slides of the planter to drop a charge of seed.

The pinion F'' may be dispensed with in so far as it has anything to do with rotating the pinion F, and devices substituted for it which act to hold the pinion F'' in gear with the internal gear of the drive-wheel.

Instead of the mechanism shown for transmitting motion from the pinion F to the planter seed-slides, bevel-pinions and rods may evidently be used if ball-and-socket or other universal-joint couplings be used.

The vertically-swinging frame will permit the wheel D to rotate and pass over high and low places in the ground without affecting the wheel in its correct measurement of the distances between the hills of corn.

Having thus described my invention, what I claim as new, and desire to secure by Letters Patent, is—

1. In a check-row corn-planter, in combination with the planter, a supplemental drive-wheel for operating the seed-slides, connected with the planter by means of a frame, which is connected with the supplemental drive-wheel by a pinion journaled in said frame, and in gear with an internal gear in the drive-wheel, near the upper side of said wheel, substantially as and for the purpose specified.

2. In a check-row corn-planter, in combination with the planter, a supplemental drive-wheel provided with an internal gear, $d$, pinions F, F', and F'', and frame E, substantially as and for the purpose specified.

3. In a check-row corn-planter, in combination with the planter, a supplemental drive-wheel provided with an internal gear, $d$, a pinion, F, and a pinion, F', the pinion F' connected with the frame E, which draws the drive-wheel, and located near the upper side of the drive-wheel, substantially as and for the purpose specified.

4. In a check-row corn-planter, in combination with the planter, a supplemental drive-wheel provided with internal gear, $d$, pinions F and F', and frame E, substantially as and for the purpose specified.

5. In a check-row corn-planter, in combination, the planter drive-wheel D, having internal gear, $d$, pinions F F' F'', frame E, formed of bars E', and arms E'', and mechanism for transmitting motion from the pinion F to the planter seed-slides, substantially as and for the purpose specified.

6. In combination, the planter drive-wheel suspended in a swinging frame and provided with gear $d$, pinions F F', crank-bar I, rod $h'''$, sliding rod H', slotted connecting-rod $h''$, elbow-lever H, rod $h'$, and slide-bar C, substantially as and for the purpose specified.

7. In a check-row corn-planter, in combination with the planter and a drive-wheel, D, and pinions F F', the adjustable slotted crank-arm I, adapted to receive motion from the pinion F and to impart movement to the seed-slides of the planter through suitable connection therewith.

In testimony whereof I affix my signature in presence of two witnesses.

WILLIAM B. CHAMBERS.

Witnesses:
 WILLIAM B. RUSH,
 WM. E. HENKLE.